United States Patent [19]

Ohno

[11] Patent Number: 5,999,332

[45] Date of Patent: Dec. 7, 1999

[54] COMPACT WIDE-ANGLE LENS

[75] Inventor: Kazunori Ohno, Omiya, Japan

[73] Assignee: Fuji Photo Optical Co., Ltd., Omiya, Japan

[21] Appl. No.: 09/024,660

[22] Filed: Feb. 17, 1998

[30] Foreign Application Priority Data

Mar. 5, 1997 [JP] Japan ..................................... 9-069227

[51] Int. Cl.$^6$ ................................................. G02B 15/14
[52] U.S. Cl. .......................................... 359/692; 359/691
[58] Field of Search .................... 359/690, 691, 359/692

[56] References Cited

U.S. PATENT DOCUMENTS

| | | | | |
|---|---|---|---|---|
| 5,270,867 | 12/1993 | Estelle | ..................................... | 359/692 |
| 5,796,527 | 8/1998 | Ohtake | ..................................... | 359/692 |

FOREIGN PATENT DOCUMENTS

| | | |
|---|---|---|
| 5-2204 | 1/1993 | Japan . |
| 5-173062 | 7/1993 | Japan . |

*Primary Examiner*—Georgia Epps
*Assistant Examiner*—Michael A Lucas
*Attorney, Agent, or Firm*—Arnold International; Bruce Y. Arnold

[57] ABSTRACT

A compact wide-angle lens having a front lens group of positive refractive power and a rear lens group of negative refractive power. The front lens group is composed of three lens elements having refractive powers, in order from the object side, of negative, positive, and positive, and the rear lens group is composed of a negative meniscus lens element. The front lens group is composed of a negative meniscus lens element with its concave surface nearest the photographic object side, a positive meniscus lens element of weak refractive power with its convex surface on the photographic object side, and a biconvex lens element. A surface of the second lens element of the front lens group is made to be aspheric and conditional equations are required to be satisfied in order to make the lens have good imaging performance over a wide-angle field of view of approximately 70 degrees.

13 Claims, 3 Drawing Sheets

COMPACT WIDE-ANGLE LENS

BACKGROUND OF THE INVENTION

In recent years, there has been an increase in demand for lens shutter cameras having good performance and high portability, i.e., ones that are smaller and lighter in weight. Additionally, there has been a trend toward using wider-angle lenses. Interchangeable lenses of the retro-focus type have been known in the prior art as wide-angle lenses for single lens reflex cameras, and lens shutter cameras having wide-angle lenses have also been known, as disclosed in Japanese Laid-Open Patent Publication 5-173062. In such retro-focus lenses, a lens element of negative refractive power is arranged nearest photographic object side. However, retro-focus lenses having a short on-axis distance between the lens element surface nearest the object side and the focal plane (hereinafter this distance is termed the "overall lens length") have not become available.

On the one hand, telephoto-type lenses have also been developed as photographic lenses having a short overall lens length by using a positive refractive power lens group arranged nearest the photographic object side. For example, such a lens is disclosed in Japanese Patent Publication 5-2204. In this lens there is strong asymmetry because a positive refractive power lens is too strong. When attempting to re-design such a lens to be a wide-angle lens, the curvature of field as well as lateral color, distortion, and coma become a problem at the periphery of the image plane. Since the imaging performance of the lens at the periphery of the image deteriorates, in order to achieve a re-design to a wider-angle lens having a short overall lens length while using a telephoto-type lens having a front lens group of positive refractive power, it becomes necessary to improve the imaging performance at the periphery of the image plane. This requires that, in addition to reducing aberrations such as spherical aberration and curvature of field, that aberrations such as lateral color, distortion and coma that are produced by the asymmetry of having a positive front lens group and a negative rear lens group, as is characteristic of telephoto-type lenses, also be adequately corrected.

On the other hand, although the performance at the periphery of the image plane is good in a lens system which has the structural characteristics of a wide-angle lens having an object side negative lens group and a symmetrical system overall, the overall lens length of such lenses as found in the prior art is too long.

BRIEF SUMMARY OF THE INVENTION

The present invention relates to a compact wide-angle lens and, in particular, it relates to a photographic lens that is suited for use in compact cameras by having improved imaging performance at the periphery of the image plane. An object of the present invention is to provide a wide-angle lens that is of a simple construction and that has a short overall lens length, as measured from the lens element surface nearest the object side to the image plane.

BRIEF DESCRIPTION OF DRAWINGS

The present invention will become more fully understood from the detailed description given below and the accompanying drawings, which are given by way of illustration only and thus are not limitative of the present invention, and wherein:

FIGS. 2($a$)–2($c$) illustrate the spherical aberration, field curvature and distortion, respectively, which occur in the compact wide-angle lens of embodiment 1;

FIGS. 3($a$)–3($c$) illustrate the spherical aberration, field curvature and distortion, respectively, which occur in the compact wide-angle lens of embodiment 2;

FIGS. 4($a$)–4($c$) illustrate the spherical aberration, field curvature and distortion, respectively, which occur in the compact wide-angle lens of embodiment 3;

FIGS. 5($a$)–5($c$) illustrate the spherical aberration, field curvature and distortion, respectively, which occur in the compact wide-angle lens of embodiment 4; and FIGS. 6($a$)–6($c$) illustrate the spherical aberration, field curvature and distortion, respectively, which occur in the compact wide-angle lens of embodiment 5.

DETAILED DESCRIPTION

Figure 1:
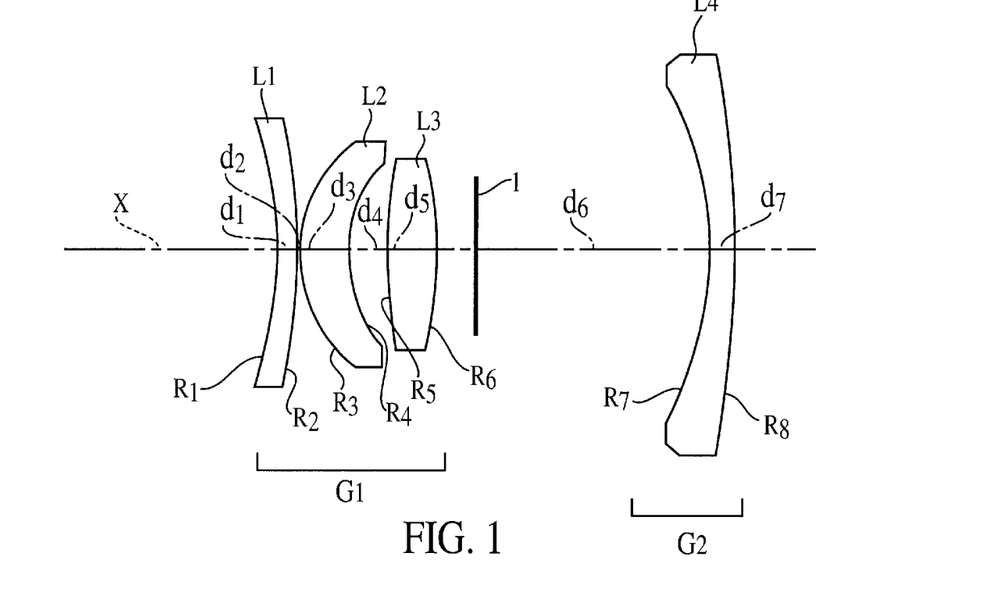
FIG. 1 illustrates the fundamental lens structure relating to all embodiments of the present invention.

The compact wide-angle lens of the present invention is illustrated in FIG. 1. FIG. 1 illustrates a lens of telephoto-type construction having a front lens group G1 of positive refractive power and a rear lens group G2 of negative refractive power separated by a lens shutter 1. The on-axis distance from the lens element surface at the extreme object side of the lens to the image plane (hereinafter termed the "overall lens length", L) of the compact wide-angle lens is made short by employing such a telephoto-type design. The front lens group G1 of positive refractive power includes, in order from the photographic object side, a negative meniscus lens element $L_1$ with its concave surface on the photographic object side, a positive meniscus lens element $L_2$ with its convex surface on the photographic object side, and a biconvex lens element $L_3$. The rear lens group G2 of negative refractive power is composed of a negative meniscus lens element $L_4$ with its concave surface on the photographic object side. Given L, as defined above, and given f as the overall focal length of the compact wide-angle lens, the telephoto ratio L/f should satisfy the following conditional equation (1):

$$0.95 < L/f < 1.05 \tag{1}$$

Also, the surface of meniscus lens element $L_2$ that is on the photographic object side should preferably be an aspheric surface. Moreover, it is also desirable if the other surface of meniscus lens element $L_2$ satisfies the following conditional equation (2)

$$0.1 < R_4/f < 0.2 \tag{2}$$

where $R_4$, is the radius of curvature of the meniscus lens element $L_2$ surface on the photographic image side, and f is as defined above.

In addition, it is desirable for the meniscus lens element $L_2$ to be made of an organic material, Furthermore, it is desirable that focusing be performed by moving the front lens group G1 along the optical axis X.

By positioning negative meniscus lens element $L_1$ on the extreme object side of the front lens group G1, a balance of refractive power is achieved with respect to positive meniscus lens element $L_2$. By further positioning positive meniscus lens element $L_2$ with its convex surface on the object side, the color dispersion of negative meniscus lens element $L_1$ is negated, and the back focus of the compact wide-angle lens is shortened. Furthermore, with regard to the luminous flux at the periphery of a lens element, the incidence angles of rays onto the lens element surface should not become excessive, and it is thus necessary to make the difference between the angle of incidence onto the meniscus lens element $L_2$ and the exiting angle of rays from meniscus lens element $L_2$ smaller than would occur using spherical lens surfaces. Because of this, meniscus lens element $L_2$ is designed to have an aspheric shape on its convex surface, and the front lens group G1 is designed to have a positive refractive power that results primarily from biconvex lens element $L_3$. This positive refractive power of the front lens group G1 allows the luminous flux from lens element $L_3$ to be incident within the outer perimeter of lens element $L_4$. Good symmetry (i.e., smaller aberrations) of the lens is ensured by having the positive refractive power of lens element $L_3$ in the front lens group G1 be balanced by the negative refractive power of lens element $L_4$ in the rear lens group. Also, by such an arrangement, a lens structure is made that combines the characteristics of a telephoto type lens and a wide-angle lens.

By providing lens groups of positive and negative refractive power, respectively, in order from the object side, and by arranging the lens elements in each lens group as illustrated in FIG. 1, a compact wide-angle lens can be achieved wherein the overall length L of the lens is short. Moreover, the lens provides good optical performance, even at the periphery of the image plane, over a wide-angle of view of approximately 70 degrees.

Also, conditional equation (1) sets forth the range wherein, with the above lens structure, good imaging at peripheral angles can be achieved while allowing the overall lens length to be compact. The overall length L of the lens becomes too small if the value of L/f is smaller than the lower limit of conditional equation (1). Although there is efficacy in miniaturization of the lens, the refractive power of the front and rear lens groups each becomes strong, the asymmetry also becomes strong, and there is an accompanying deterioration of performance at the periphery of the image. If the space between the front and rear lens groups becomes large and the power of the front and rear lens groups becomes small, a certain amount of improvement can be made in the performance of the lens at the periphery of the image, but as the diameters of the lens elements on the photographic object side and the lens elements on the photographic image side become larger, it becomes difficult to make the overall lens compact. On the one hand, if the value of L/f exceeds the upper limit of conditional equation (1), the symmetry of the lens improves and, although there is efficacy in terms of peripheral performance, the overall length L of the lens becomes too long, making a compact lens impossible to achieve.

Conditional equation (2) further sets forth the range for maintaining good imaging. In other words, in order to achieve a change toward a wider-angle lens structure of the telephoto type, it becomes necessary to arrange the positive meniscus lens element $L_2$ with its concave surface on the image side. However, because the front surface of meniscus lens element $L_2$ has rather a strong convex curvature on the photographic object side, the spherical aberration is large, and thus the image-forming performance of the lens deteriorates at the periphery of the image. If limited to using a surface that is spherical, upon trying to reduce the spherical aberration of meniscus lens element $L_2$, the radius of curvature of this surface must be made larger, and the strong color dispersion generated by the negative meniscus lens element $L_1$ cannot be negated. On the one hand, if one attempts to correct the spherical aberration by partitioning meniscus lens element $L_2$ into multiple lens elements, the number of lens elements increases. Furthermore, the outer diameter of the negative meniscus lens element $L_1$ becomes large, which opposes miniaturization of the lens system. Because of this, it is extremely desirable to further figure the surface of meniscus lens element $L_2$ on the photographic object side to be an aspheric surface.

Conditional equation (2) regulates the range of curvature radius $R_4$ of the rear surface of the meniscus lens element $L_2$. If the value of $R_4/f$ drops below the lower limit of conditional equation (2), the curvature radius $R_4$ of the rear surface of meniscus lens element $L_2$ becomes too small, the positive refractive power of the meniscus lens element $L_2$ becomes too weak, and the overall length of the lens becomes too long. There is also an accompanying deterioration in the performance of the lens at the periphery of the image, and the convergence characteristic of the aspheric surface must be maintained or the curvature of the front surface of meniscus lens element $L_2$ becomes too large. Furthermore, even if this is corrected by the negative meniscus lens element $L_1$, problems result where the overall length of the lens becomes long.

On the other hand, if the value of $R_4/f$ goes above the upper limit of conditional equation (2), the positive refractive power of the meniscus lens element $L_2$ becomes too strong and, although the overall length of the lens becomes smaller, correction of the spherical aberration becomes insufficient. In order to correct the spherical aberration, the curvature of the front surface of meniscus lens element $L_2$ must be made to be smaller, and there are accompanying problems of a deterioration of the image at the periphery of the image due to curvature of field of the image plane, distortion, and the like when the color dispersion characteristics for an aspheric surface are considered.

If the meniscus lens element $L_2$ is made of an organic material, production costs are lowered with regard to further figuring the surface of $L_2$ on the photographic object side to be an aspheric surface. Furthermore, operational effectiveness is achieved by making $L_2$ of an organic material in the case where there is a large aptitude for mass production. Of course, a change to an aspheric surface is possible even if the lens element $L_2$ is made of glass, but there is a problem in that the manufacturing costs are high. The index of refraction of organic materials changes slightly with changes in temperature and humidity, resulting in the possibility that the image-forming positions will change in the case of a lens formed of an organic material. However, because the refractive power of meniscus lens $L_2$ is weak, the change in position of the image is extremely small and can be ignored.

The amount of lens movement required for focusing is minimized if the front lens group is moved as a unit during focusing. Furthermore, the weight of the moving group is also minimized if the front lens group is moved as a unit during focusing. If the lens shutter member is also arranged to be somewhat centered between the front lens group and the rear lens group, miniaturization of the camera is effective and desirable.

Five embodiments of the present invention will now be described using actual numerical values.

Embodiment 1

Table 1 shows the values of the radius of curvature R (in mm) of each lens element surface, the on-axis surface spacing d (in mm), as well as the values of the index of refraction $n_d$ and the Abbe number $v_d$ (for the sodium d line) of each lens element of the lens which apply to embodiment 1. The surface numbers (#) in the table indicate the surface order from the photographic object side.

TABLE 1

| # | R | d | $n_d$ | $V_d$ |
|---|---|---|---|---|
| 1 | −37.2097 | 1.6687 | 1.80517 | 25.5 |
| 2 | −72.5590 | 0.4270 | | |
| 3* | 14.7892 | 5.1059 | 1.49023 | 57.6 |
| 4 | 14.6924 | 3.9813 | | |
| 5 | 52.3020 | 5.3006 | 1.62299 | 58.1 |
| 6 | −52.3020 | 29.0244 | | |
| 7 | −35.1571 | 2.5522 | 1.51742 | 52.2 |
| 8 | −108.2314 | | | |

Position of focus is 3.6123 mm to the image plane side from surface #6

In addition, the surface with a * to the right of the surface number in Table 1 above is made to be aspheric, with an aspheric shape as indicated in equation (3) below.

$$X = Ch^2/\{1+(1-KC^2h^2)^{1/2}\} + a_2h^4 + a_3h^6 + a_4h^8 + a_5h^{10} \quad (3)$$

where

X is the distance (in mm) of a point on the aspherical surface from the tangential plane at the lens element surface vertex, C is the curvature (=1/R) of the aspheric surface vertex, h is the height (in mm) from the optical axis, K is the eccentricity, and $a_2$, $a_3$, $a_4$, $a_5$ are the coefficient constants of the 4th, 6th, 8th and 10th exponential number terms, respectively, for the aspheric surface.

In Table 2, below, the values for each of the constants C, K, $a_2$, $a_3$, $a_4$, and $a_5$ of equation (3), above, are given for the aspheric surface indicated by * in Table 1.

TABLE 2

| # | C | K | $a_2$ | $a_3$ | $a_4$ | $a_5$ |
|---|---|---|---|---|---|---|
| 3 | 0.067617 | 0.73270 | $-1.56113 \times 10^{-6}$ | $-1.87832 \times 10^{-11}$ | $-1.90296 \times 10^{-17}$ | $-2.00691 \times 10^{-24}$ | f = 100.000
l' = 50.754
L = 98.814
$f_F$ = 65.657
L/f = 0.988
$R_4$/f = 0.147

Also, in the lower rows of Table 2, the values of the effective focal length f, the back focus l', the overall lens length L (i.e., the on-axis distance from the lens element surface nearest the object side to the image plane), the focal length $f_F$ of the front lens group, the telephoto ratio L/f, and the ratio of $R_4$/f (i.e., the radius of the surface on the image-forming side of lens element $L_2$ divided by the effective focal length of the entire lens system). As shown in the Table 2 the value of the telephoto ratio L/f is 0.988 and of the value of the ratio $R_4$/f is 0.147. Thus conditional equations (1) and (2) are satisfied for embodiment 1.

Figure 2A:
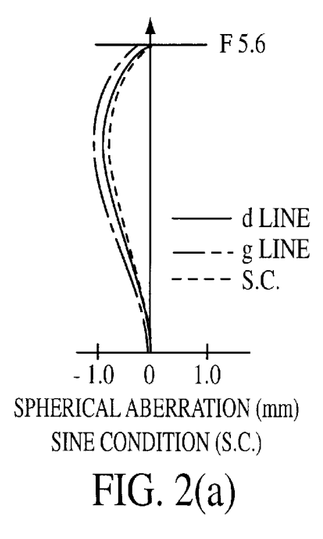
Figure 2B:
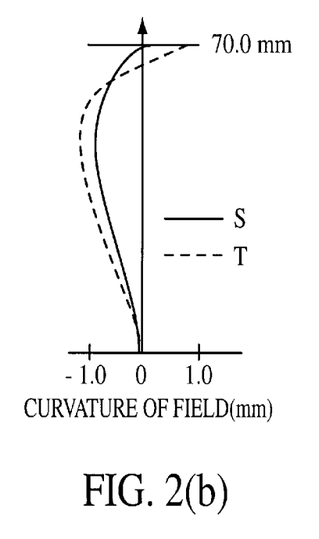
Figure 2C:
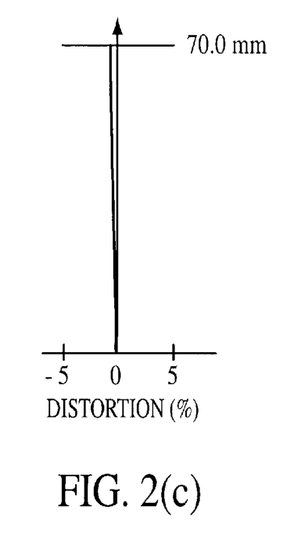

FIGS. 2(a)–2(c) illustrate the spherical aberration, field curvature and distortion, respectively, which occur in the compact wide-angle lens of embodiment 1. As is apparent from these figures, these aberrations are satisfactorily small.

Embodiment 2

Table 3, gives the radius of curvature R (in mm) of each lens element surface, the on-axis surface spacing d (in mm), as well as the values of the index of refraction $n_d$ and the Abbe number $v_d$ (for the sodium d line) on each lens element of the lens of embodiment 2. The surface numbers (#) in the table indicate the order of the surfaces from the photographic object side.

TABLE 3

| # | R | d | $n_d$ | $V_d$ |
|---|---|---|---|---|
| 1 | −36.6375 | 1.7033 | 1.80517 | 25.5 |
| 2 | −76.4257 | 0.3005 | | |
| 3* | 13.8128 | 4.3607 | 1.49023 | 57.6 |
| 4 | 13.7595 | 3.6273 | | |
| 5 | 57.1861 | 5.4092 | 1.69680 | 55.6 |
| 6 | −57.1861 | 27.7554 | | |
| 7 | −35.0578 | 2.6045 | 1.54869 | 45.4 |
| 8 | −82.8068 | | | |

Position of focus is 3.6864 mm to the image plane side from surface #6

In addition, the surface in Table 3 with * to the right of the surface number is made to be aspheric. The aspheric shape is given by equation (3), above, in conjunction with Table 4, below. In Table 4, below, the values for each of the constants C, K, $a_2$, $a_3$, $a_4$, and $a_5$ of equation (3) above are given for the aspheric surface indicated by * in Table 3.

TABLE 4

| # | C | K | $a_2$ | $a_3$ | $a_4$ | $a_5$ |
|---|---|---|---|---|---|---|
| 3 | 0.072397 | 0.77435 | $-2.78589 \times 10^{-6}$ | $-1.33536 \times 10^{-11}$ | $-7.89940 \times 10^{-18}$ | $-1.00607 \times 10^{-23}$ | f = 100.006
l' = 59.306
L = 100.067
$f_F$ = 66.363
L/f = 1.001
$R_4$/f = 0.138

Also, in the lower rows of Table 4 are listed the value of the effective focal length f, the back focus l', the overall lens length L (i.e., the on-axis distance from the lens element surface nearest the object side to the image plane), the focal length $f_F$ of the front lens group, the telephoto ratio L/f, and the ratio of $R_4$/f (i.e., the radius of the surface on the image-forming side of lens element $L_2$ divided by the effective focal length of the entire lens system). As shown in the Table 4, the value of the telephoto ratio L/f is 1.001 and of the value of the ratio $R_4$/f is 0.138. Thus conditional equations (1) and (2) are satisfied for embodiment 2.

Figure 3A:
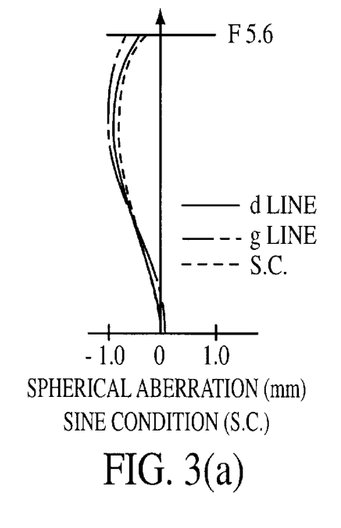
Figure 3B:
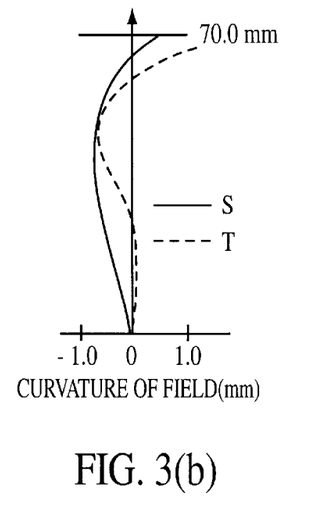
Figure 3C:
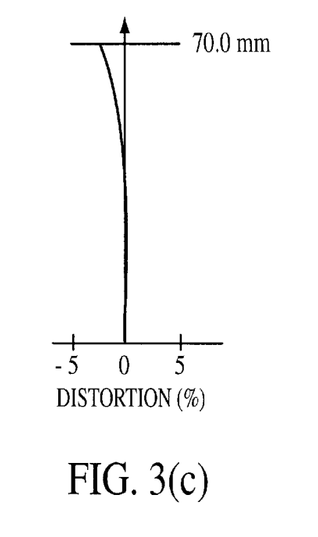

FIGS. 3(a)–3(c) illustrate the spherical aberration, field curvature and distortion, respectively, which occur in the compact wide-angle lens of embodiment 2. As is apparent from these figures, these aberrations are satisfactorily small.

Embodiment 3

Table 5, below, shows the values of the radius of curvature R (in mm) of each lens element surface, the on-axis surface spacing d (in mm), as well as the values of the index of refraction $n_d$ and the Abbe number $v_d$ (for the sodium d line) of each lens element of the lens of embodiment 3. The surface numbers (#) in the table indicate the order of the surfaces from the photographic object side.

TABLE 5

| # | R | d | $n_d$ | $V_d$ |
|---|---|---|---|---|
| 1 | −37.7646 | 1.7081 | 1.84666 | 23.8 |
| 2 | −68.5991 | 0.4420 | | |
| 3* | 16.5535 | 5.6960 | 1.49023 | 57.6 |
| 4 | 16.8806 | 3.2489 | | |
| 5 | 59.4368 | 6.0170 | 1.71300 | 53.9 |
| 6 | −59.4368 | 25.7068 | | |
| 7* | −28.5990 | 3.6167 | 1.49023 | 57.6 |
| 8 | −81.6626 | | | |

Position of focus is 0.6028 mm to the image plane-side from surface #6

In addition, the surfaces in Table 5 with * to the right of the surface numbers are made to be aspheric. The aspheric shapes are given by equation (3), above, in conjunction with Table 6, below, which gives the values for each of the constants C, K, $a_2$, $a_3$, $a_4$, and $a_5$ of the aspheric surfaces which apply for embodiment 3.

length L (i.e., the on-axis distance from the lens element surface nearest the object side to the image plane), the focal distance $f_F$ of the front lens group G1, the telephoto ratio L/f, and the ratio of $R_4$ (the radius of the surface on the image-forming side of lens element $L_2$) divided by the focal distance f of the lens are shown. The values of the telephoto ratio L/f and of the ratio $R_4$/f are 0.987 and 0.169 respectively. Thus, conditional equations (1) and (2) are satisfied for embodiment 3.

Figure 4A:
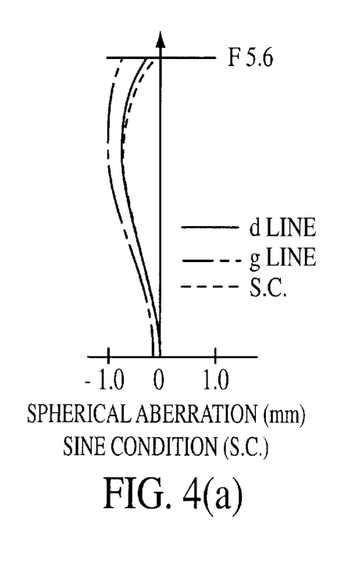
Figure 4B:
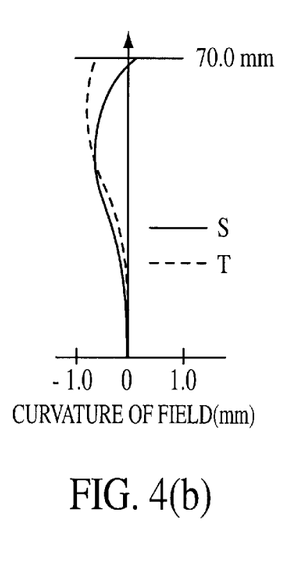
Figure 4C:
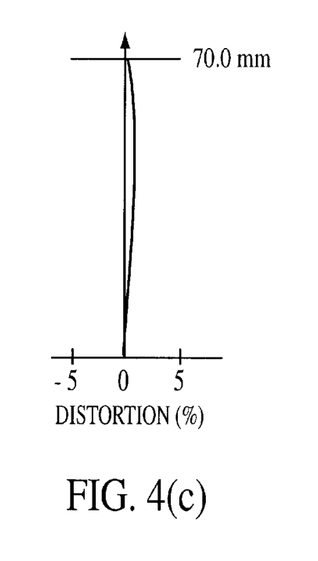

FIGS. 4(a)–4(c) illustrate the spherical aberration, field curvature and distortion, respectively, which occur in the compact wide-angle lens of embodiment 3. As is apparent from these figures, these aberrations are satisfactorily small.

Embodiment 4

Table 7, below, shows the values of the radius of curvature R (in mm) of each lens element surface, the on-axis surface spacing d (in mm), as well as the values of the index of refraction $n_d$ and the Abbe number $v_d$ (for the sodium d line) of each lens element of the lens of embodiment 4. The surface numbers (#) in the table indicate the order of the surfaces from the photographic object side.

TABLE 7

| # | R | d | $n_d$ | $V_d$ |
|---|---|---|---|---|
| 1 | −37.5047 | 1.7407 | 1.76182 | 26.5 |
| 2 | −83.3802 | 0.5529 | | |
| 3* | 17.2652 | 5.3995 | 1.49023 | 57.6 |
| 4 | 17.6216 | 3.0863 | | |
| 5 | 56.9017 | 6.1433 | 1.71300 | 53.9 |
| 6 | −56.9017 | 26.1819 | | |
| 7* | −30.6542 | 3.6862 | 1.49023 | 57.6 |
| 8 | −91.3056 | | | |

Position of focus is 0.6144 mm to the image plane side from surface #6

In addition, the surfaces in Table 7 with * to the right of the surface numbers are made to be aspheric. The aspheric shapes are given by equation (3), above, in conjunction with Table 8, below, which gives the values for each of the

TABLE 6

| # | C | K | $a_2$ | $a_3$ | $a_4$ | $a_5$ |
|---|---|---|---|---|---|---|
| 3 | 0.060410 | 0.65312 | 1.27987×10⁻⁷ | −1.29316×10⁻¹¹ | −1.19239×10⁻¹⁷ | −1.33152×10⁻²⁴ |
| 7 | 0.059240 | −1.22345 | −1.32532×10⁻⁵ | 5.98541×10⁻¹¹ | 2.94875×10⁻¹⁶ | 2.75975×10⁻²³ | f = 100.000
l' = 52.218
L = 98.654
$f_F$ = 62.105
L/f = 0.987
$R_4$/f = 0.169

Also, in the lower rows of Table 6, the values of overall focal distance f of the lens, the back focus l', the overall lens constants C, K, $a_2$, $a_3$, $a_4$, and as of the aspheric surfaces which apply for embodiment 4.

TABLE 8

| # | C | K | $a_2$ | $a_3$ | $a_4$ | $a_5$ |
|---|---|---|---|---|---|---|
| 3 | 0.057920 | 0.60426 | $1.18806 \times 10^{-6}$ | $-1.38784 \times 10^{-11}$ | $-1.64864 \times 10^{-17}$ | $-1.04336 \times 10^{-23}$ |
| 7 | -0.032622 | -1.29120 | $-1.26349 \times 10^{-5}$ | $5.08924 \times 10^{-11}$ | $2.14197 \times 10^{-16}$ | $4.14377 \times 10^{-24}$ |

$$f = 100.005$$
$$l' = 53.713$$
$$L = 100.504$$
$$f_F = 62.552$$
$$L/f = 1.005$$
$$R_4/f = 0.176$$

Also, in the lower rows of Table 8, the values of overall focal length f of the lens, the back focus l', the overall lens length L (i.e., the on-axis distance from the lens element surface nearest the object side to the image plane), the focal distance $f_F$ of the front lens group G1, the telephoto ratio L/f, and the ratio of $R_4$ (the radius of the surface on the image-forming side of lens element $L_2$) divided by the focal distance f of the lens are shown. The values of the telephoto ratio L/f and of the ratio $R_4$/f are 1.005 and 0.176 respectively. Thus, conditional equations (1) and (2) are satisfied for embodiment 4.

Figure 5A:
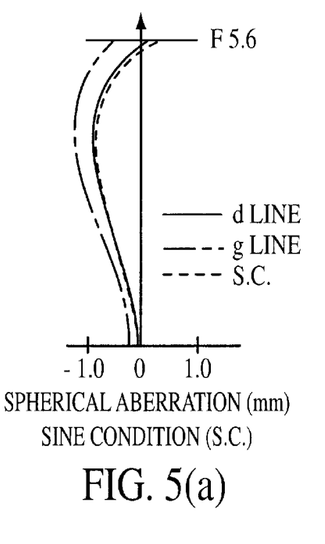
Figure 5B:
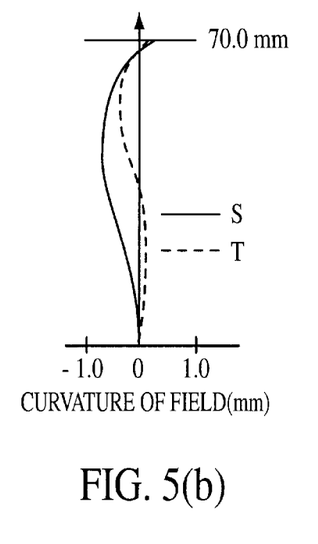
Figure 5C:
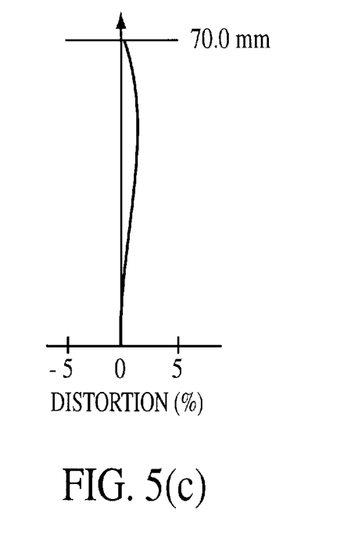

FIGS. 5(a)–5(c) illustrate the spherical aberration, field curvature and distortion, respectively, which occur in the compact wide-angle lens of embodiment 4. As is apparent from these figures, these aberrations are satisfactorily small.

Embodiment 5

Table 9, below, shows the values of the radius of curvature R (in mm) of each lens element surface, the on-axis surface spacing d (in mm), as well as the values of the index of refraction $n_d$ and the Abbe number $v_d$ (for the sodium d line) of each lens element of the lens of embodiment 5. The surface numbers (#) in the table indicate the order of the surfaces from the photographic object side.

TABLE 9

| # | R | d | $n_d$ | $V_d$ |
|---|---|---|---|---|
| 1 | -35.8282 | 1.6910 | 1.76182 | 26.5 |
| 2 | -72.8387 | 0.3979 | | |
| 3* | 17.0093 | 5.3712 | 1.49023 | 57.6 |
| 4 | 17.6041 | 3.3836 | | |
| 5 | 64.3164 | 4.9727 | 1.71300 | 53.9 |
| 6 | -52.9223 | 24.6687 | | |
| 7* | -28.8891 | 3.5810 | 1.49023 | 57.6 |
| 8 | -80.5445 | | | |

Position of focus is 0.1989 mm to the image plane side from surface #6.

In addition, the surfaces in Table 9 with * to the right of the surface numbers are made to be aspheric. The aspheric shapes are given by equation (3), above, in conjunction with Table 10, below, which gives the values for each of the constants C, K, $a_2$, $a_3$, $a_4$, and $a_5$ of the aspheric surfaces which apply for embodiment 5.

TABLE 10

| # | C | K | $a_2$ | $a_3$ | $a_4$ | $a_5$ |
|---|---|---|---|---|---|---|
| 3 | 0.058791 | 0.57716 | $1.05924 \times 10^{-6}$ | $-1.56920 \times 10^{-11}$ | $-1.95184 \times 10^{-17}$ | $-1.33124 \times 10^{-23}$ |
| 7 | -0.034615 | -1.17647 | $-1.36435 \times 10^{-5}$ | $6.20098 \times 10^{-11}$ | $2.89789 \times 10^{-16}$ | $1.46221 \times 10^{-22}$ |

$$f = 100.000$$
$$l' = 55.487$$
$$L = 99.553$$
$$f_F = 61.317$$
$$L/f = 0.996$$
$$R_4/f = 0.176$$

Also, in the lower rows of Table 10, the values of overall focal distance f of the lens, the back focus l', the overall lens length L (i.e., the on-axis distance from the lens element surface nearest the object side to the image plane), the focal distance $f_F$ of the front lens group G1, the telephoto ratio L/f, and the ratio of $R_4$ (the radius of the surface on the image-forming side of lens element $L_2$) divided by the focal distance f of the lens are shown. The values of the telephoto ratio L/f and of the ratio $R_4$/f are 0.996 and 0.176 respectively. Thus, conditional equations (1) and (2) are satisfied for embodiment 5.

Figure 6A:
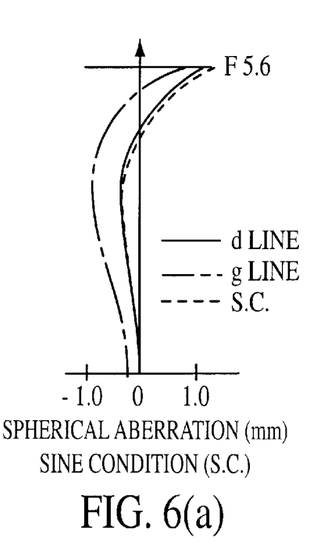
Figure 6B:
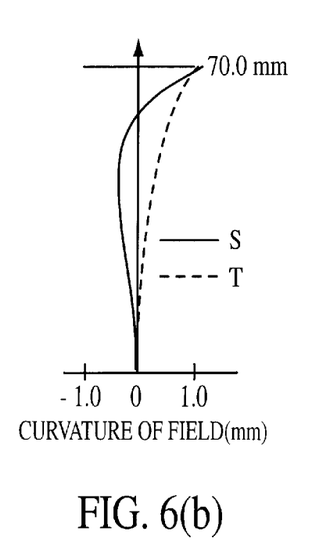
Figure 6C:
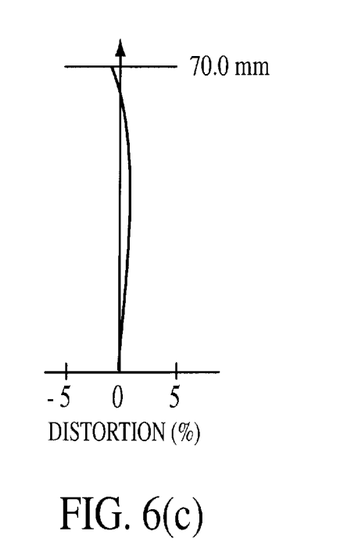

FIGS. 6(a)–6(c) illustrate the spherical aberration, field curvature and distortion, respectively, which occur in the compact wide-angle lens of embodiment 5. As is apparent from these figures, these aberrations are satisfactorily small.

Based on the compact wide-angle lens of the present invention, the lens is partitioned into a front lens group G1 and a rear lens group G2 with lens shutter 1 positioned between the two lens groups. The front group is made to have positive refractive power, and the rear group is made to have negative refractive power. By making the lens be a telephoto-type design, the overall length of the lens is shortened. Also, a balance is achieved with respect to the negative rear lens group by having the lens element $L_1$ in the front lens group be a negative meniscus lens. Color dispersion of the negative meniscus lens element $L_1$ is negated by positive meniscus lens $L_2$. Also, the back focus of the lens is shortened by arranging weakly positive refractive power meniscus lens element $L_2$ with its convex surface of rather strong curvature on the object side and nearby negative meniscus lens element $L_1$. Moreover, because the convergence action otherwise becomes too strong with respect to the luminous flux at peripheral angles of view, the meniscus lens element $L_2$ is made to be of a convex shape so that there will be little difference in the angle of incidence of rays onto the meniscus lens element $L_2$ and the exit angle of rays from meniscus lens element $L_2$. Also, the front lens group G1 is made to have positive refractive power by the biconvex lens element $L_3$ so that the incident light beam height of the peripheral luminous flux does not become too large. Therefore, symmetry of the lens is ensured by virtue of a balance of the refractive power of positive lens element $L_3$ with the refractive power of negative lens element $L_4$ in the rear lens group. The overall length of the lens is made short by the above lens structure. Furthermore, a lens can be made having favorable peripheral imaging performance at an angle of view of approximately 70 degrees. Also, the telephoto ratio is set within a prescribed range by conditional equation (1). By so doing, it is possible for a good balance to be obtained between the lens being compact versus the lens providing good imaging at the periphery of the image plane.

The invention being thus described, it will be obvious that the same may be varied in many ways. Such variations are not to be regarded as a departure from the spirit and scope of the invention. For example, rather than the aspheric surfaces being formed by figuring a spherical surface, these surfaces may be formed directly by spin casting or using a mold or die. Also, the appropriate selection of the shape of the lens elements which comprise each of the lens groups, the number of aspheric surfaces, and the shape of the aspheric surfaces may be varied. All such modifications as would be obvious to one skilled in the art are intended to be included within the scope of the following claims.

What is claimed is:

1. A compact wide-angle lens comprising:
   a front lens group of positive refractive power and a rear lens group of negative refractive power;
   said front lens group including, in order from a photographic object side, a negative meniscus first lens element with its concave surface on the photographic object side, a meniscus second lens element with its convex surface on the photographic object side, and a biconvex third lens element; and
   said rear lens group being composed entirely of a negative meniscus fourth lens element with its concave surface on the photographic object side;
   wherein the following conditional equations are satisfied $0.95 < L/f < 1.05$ $0.1 < R_4/f < 0.2$ where
   L is the on-axis distance from the lens element surface positioned at the photographic object side of said compact wide-angle lens to the image plane of said compact wide-angle lens,
   f is the focal distance of the compact wide-angle lens, and
   $R_4$ is the radius of curvature of the image side of said second lens element.

2. The compact wide-angle lens of claim 1, wherein the convex surface of said second lens element is aspheric, and wherein there are no intervening lens elements other than said second lens element and said third lens element between said first lens element and said fourth lens element.

3. The compact wide-angle lens of claim 2, wherein focusing is performed by moving the front lens group along the optical axis.

4. The compact wide-angle lens of claim 1, and further comprising said positive meniscus lens element being made of an organic material.

5. The compact wide-angle lens of claim 2, and further comprising said positive meniscus lens element being made of an organic material.

6. The compact wide-angle lens of claim 1, wherein focusing is performed by moving the front lens group along the optical axis.

7. The compact wide-angle lens of claim 1, wherein focusing is performed by moving the front lens group along the optical axis.

8. The compact wide-angle lens of claim 1, wherein the construction parameters as set forth below are satisfied:

| # | R | d | $n_d$ | $v_d$ |
|---|---|---|---|---|
| 1 | −37.2097 | 1.6687 | 1.80517 | 25.5 |
| 2 | −72.5590 | 0.4270 | | |
| 3 | 14.7892 | 5.1059 | 1.49023 | 57.6 |
| 4 | 14.6924 | 3.9813 | | |
| 5 | 52.3020 | 5.3006 | 1.62299 | 58.1 |
| 6 | −52.3020 | 29.0244 | | |
| 7 | −35.1571 | 2.5522 | 1.51742 | 52.2 |
| 8 | −108.2314 | | | | where # is the surface number from the photographic object side, R is the radius of curvature in mm, d is the on-axis surface spacing in mm, $n_d$ is the index of refraction, and $v_d$ the Abbe number, and wherein surface #3 is further figured to be aspheric.

9. The compact wide-angle lens of claim 1, wherein the construction parameters as set forth below are satisfied:

| # | R | d | $n_d$ | $v_d$ |
|---|---|---|---|---|
| 1 | −36.6375 | 1.7033 | 1.80517 | 25.5 |
| 2 | −76.4257 | 0.3005 | | |
| 3 | 13.8128 | 4.3607 | 1.49023 | 57.6 |
| 4 | 13.7595 | 3.6273 | | |
| 5 | 57.1861 | 5.4092 | 1.69680 | 55.6 |
| 6 | −57.1861 | 27.7554 | | |
| 7 | −35.0578 | 2.6045 | 1.54869 | 45.4 |
| 8 | −82.8068 | | | | where # is the surface number from the photographic object side, R is the radius of curvature in mm, d is the on-axis surface spacing in mm, $n_d$ is the index of refraction, and $v_d$ the Abbe number, and wherein surface #3 is further figured to be aspheric.

10. The compact wide-angle lens of claim 1, wherein the construction parameters as set forth below are satisfied:

| # | R | d | $n_d$ | $v_d$ |
|---|---|---|---|---|
| 1 | −37.7646 | 1.7081 | 1.84666 | 23.8 |
| 2 | −68.5991 | 0.4420 | | |
| 3 | 16.5535 | 5.6960 | 1.49023 | 57.6 |
| 4 | 16.8806 | 3.2489 | | |
| 5 | 59.4368 | 6.0170 | 1.71300 | 53.9 |
| 6 | −59.4368 | 25.7068 | | |
| 7 | −28.5990 | 3.6167 | 1.49023 | 57.6 |
| 8 | −81.6626 | | | | where # is the surface number from the photographic object side, R is the radius of curvature in mm, d is the on-axis surface spacing in mm, $n_d$ is the index of refraction, and $v_d$ the Abbe number, and wherein surface #3 and surface #7 are further figured to be aspheric.

11. The compact wide-angle lens of claim 1, wherein the construction parameters as set forth below are satisfied:

| # | R | d | $n_d$ | $V_d$ |
|---|---|---|---|---|
| 1 | -37.5047 | 1.7407 | 1.76182 | 26.5 |
| 2 | -83.3802 | 0.5529 | | |
| 3 | 17.2652 | 5.3995 | 1.49023 | 57.6 |
| 4 | 17.6216 | 3.0863 | | |
| 5 | 56.9017 | 6.1433 | 1.71300 | 53.9 |
| 6 | -56.9017 | 26.1819 | | |
| 7 | -30.6542 | 3.6862 | 1.49023 | 57.6 |
| 8 | -91.3056 | | | | where # is the surface number from the photographic object side, R is the radius of curvature in mm, d is the on-axis surface spacing in mm, $n_d$ is the index of refraction, and $v_d$ the Abbe number, and wherein surface #3 and surface #7 are further figured to be aspheric.

12. The compact wide-angle lens of claim 1, and wherein the construction parameters as set forth below are satisfied:

| # | R | d | $n_d$ | $V_d$ |
|---|---|---|---|---|
| 1 | -35.8282 | 1.6910 | 1.76182 | 26.5 |
| 2 | -72.8387 | 0.3979 | | |
| 3 | 17.0093 | 5.3712 | 1.49023 | 57.6 |
| 4 | 17.6041 | 3.3836 | | |
| 5 | 64.3164 | 4.9727 | 1.71300 | 53.9 |
| 6 | -52.9223 | 24.6687 | | |
| 7 | -28.8891 | 3.5810 | 1.49023 | 57.6 |
| 8 | -80.5445 | | | | where # is the surface number from the photographic object side, R is the radius of curvature in mm, d is the on-axis surface spacing in mm, $n_d$ is the index of refraction, and $v_d$ the Abbe number, and wherein surface #3 and surface #7 are further figured to be aspheric.

13. A compact, fixed focal length, wide-angle lens comprising:

a front lens group of positive refractive power and a rear lens group of negative refractive power;

said front lens group including, in order from a photographic object side, a negative meniscus first lens element with its concave surface on the photographic object side, a meniscus second lens element with its convex surface on the photographic object side, and a biconvex third lens element; and said rear lens group being composed entirely of a negative meniscus fourth lens element with its concave surface on the photographic object side;

wherein the following conditional equation is satisfied $$0.95 < L/f < 1.05$$

where

L is the on-axis distance from the lens element surface positioned at the photographic object side of said compact wide-angle lens to the image plane of said compact wide-angle lens, and f is the focal distance of the compact wide-angle lens.

* * * * *

UNITED STATES PATENT AND TRADEMARK OFFICE
CERTIFICATE OF CORRECTION

PATENT NO : 5,999,332
DATED : Dec. 7, 1999
INVENTOR(S): Kazunori Ohno It is certified that error appears in the above-identified patent and that said Letters Patent are hereby corrected as shown below:

In Table 4, the value of $a_5$ should be positive rather than negative.

Signed and Sealed this

Twenty-fourth Day of April, 2001

Attest:

NICHOLAS P. GODICI

*Attesting Officer*    *Acting Director of the United States Patent and Trademark Office*